3,293,125
FLUOROCHLOROPROPANE FUMIGANTS
Everett E. Gilbert, Morris Township, Morris County, N.J., assignor to Allied Chemical Corporation, New York, N.Y., a corporation of New York
No Drawing. Filed Apr. 25, 1963, Ser. No. 275,498
5 Claims. (Cl. 167—39)

This invention relates to fluorochloropropane fumigants and to a method for controlling pest organisms therewith.

As is known in the art, the control of pest organisms which infest hosts such as soil, grain, fruits, vegetables, textiles, dwellings, warehouses, and the like, is quite difficult in those cases where the pest organisms penetrate deeply into the interior of the host space. The use of surface poisons or pesticides for this purpose is not entirely effective because of the difficulty in reaching the interior of the host space. Attempts were made to control such pests by passing gaseous toxicants through the infested material or spaces. Examples of some of the common fumigants employed for this purpose include hydrogen cyanide, chlorinated hydrocarbons, such as carbon tetrachloride, trichloronitromethane and 1,1-dichloronitroethane. Unfortunately, the known chlorinated hydrocarbons employed possess undesirable characteristics including a high toxicity toward humans whereas it is common knowledge that hydrogen cyanide is one of the most lethal of all gases. Furthermore, although 1,1-dichloronitroethane is effective as an insect killer, it suffers from the disadvantage that it is severely phytotoxic and consequently its use against insects infesting plants is severely limited.

I have found that the two compounds 1,1,3,3-tetrafluorotetrachloropropane and 1,1,3-trifluoropentachloropropane are surprisingly effective fumigants not only in exerting extremely lethal effects against the common penetrating pests, such as those infesting plants, plant parts, grain, flour, carpets, etc., but that their toxicity is inherently less to humans than certain of the fumigants heretofore largely used. Moreover, they possess a high degree of volatility which permits deep penetration of the fumigants into the interior of the host space. It is regarded as surprising and contrary to normal expectations that these materials should have fumigant activity since fluorochloro aliphatic compounds as a class (e.g. Genetron refrigerants) are notably inert.

Procedurally the process to which the present invention is directed comprises contacting the pests in the enclosure in which the pests exist with either one or both of two fluorochloropropane compounds having the following general formula:

$$F-\underset{\underset{Cl}{|}}{\overset{\overset{F}{|}}{C}}-\underset{\underset{Cl}{|}}{\overset{\overset{Cl}{|}}{C}}-\underset{\underset{Cl}{|}}{\overset{\overset{F}{|}}{C}}-R$$

wherein R is a member selected from the group consisting of a fluorine atom and a chlorine atom. My new process is particularly applicable to combatting infestation in flour and grain, whether contained in storage bins, grain elevators and the like and in combatting plant insects. The process of the present invention is also effective for control of other pests, such as mites, flies, roaches, etc.

The fumigation is carried out with the fluorochloropropane compounds according to well-established methods known to the art. According to one such method, either one or both of the compounds are introduced into the surrounding area in which the pests exist in such a manner that they are free to volatilize and permeate the atmosphere. In general, a dosage of about 0.20 to 2.5 lbs. of the fluorochloropropane compound per 1000 cubic feet of enclosed space is sufficient to saturate the space and to insure effective control of the pests. The fumigation may be carried out, for example, by placing one or more of the compounds in an open container or shallow tray in close contact with the atmosphere surrounding the pest organisms under conditions which allow for vaporization of the compounds.

In treating grain or flour, the liquid may simply be poured or sprayed over the grain or flour material where it is contained in the enclosure, such as in storage warehouses, bins, elevators, etc., and allowed to vaporize and to remain in the enclosed space until it has substantially completely volatilized or permeated the space. Since the vapor is heavier than air, it tends to sink to the bottom of the stack or bin and penetrate the grain as it settles, killing the pest organisms.

The effectiveness of the new fumigants for use according to my invention is illustrated by the tests described below. Fumigation tests were run against four important common pests—lesser mealworm larvae, varied carpet beetle larvae, granary weevil adults, and confused flour beetle adults—using the two compounds 1,1,3,3,-tetrafluorotetrachloropropane and 1,1,3-trifluoropentachloropropane against a control test in which no fumigant at all was used. All tests were run under substantially identical conditions. Tests were also conducted on ivy geranium leaves against brown soft scale (*Coccus hesperidum*). In carrying out these tests closed boxes containing the insects and small amounts of appropriate food, such as grain, flour, etc., are placed in a gallon mason jar. The fumigating material 1,1,3,3-tetrafluorotetrachloropropane or 1,1,3-trifluoropentachloropropane is then pipetted as liquid to absorbent cellulose placed in the jar in quantity to give desired concentrations of vapor in the jar which is thereafter sealed. After a period of exposure such as about 24 hours, the insect containers are removed and mortality counts are made immediately and at one day intervals for about one week. With respect to the effectiveness of the compounds against plant insects, the procedure varies slightly in that the insect infested plant is placed in an airtight chamber and the fumigating material is simply introduced directly into the chamber. Results obtained in the experiment are presented below:

TABLE I

| Fumigant | Amount[1] | Species[2] | Percent kill days after exposure | | | |
|---|---|---|---|---|---|---|
| | | | 0 | 1 | 4 | 7 |
| 1,1,3,3-tetrafluorotetrachloropropane. | 1.25 | Y.M. | 0 | 100 | | |
| | | L.M. | 100 | | | |
| | | B.C.B. | 0 | 80 | 100 | |
| | | C.F.B. | 80 | 100 | | |
| 1,1,3,3-tetrafluorotetrachloropropane. | .2 | Y.M. | 0 | 0 | 60 | 100 |
| | | L.M. | 0 | 80 | 100 | |
| | | B.C.B. | 0 | 40 | 40 | 60 |
| | | C.F.B. | 0 | 20 | 60 | 100 |
| Control | | All species | 0 | 0 | 0 | 0 |

[1] In pounds per 1,000 cubic feet of space.
[2] Y.M.—yellow mealworm; L.M.—lesser mealworm; B.C.B.—black carpet beetle; C.F.B.—confused flour beetle.

TABLE II

| Fumigant | Amount | Species | Percent kill days after exposure | |
|---|---|---|---|---|
| | | | 0 | 4 |
| 1,1,3-trifluoropentachloropropane. | 2.5 | Y.M. | 20 | 100 |
| | | L.M. | 100 | |
| | | B.C.B. | 0 | 100 |
| | | C.F.B. | 100 | |
| Control | | All species | 0 | 0 |

Table III indicates fumigation tests of one of the compounds 1,1,3,3-tetrafluorotetrachloropropane on ivy geranium leaves against brown soft scale in comparison with known prior art fumigant 1,1-dichloronitroethane both against a control test in which no fumigant at all was used.

TABLE III

| Compound | Amount | Percent kill, 2 days | | Percent kill, 5 days mature |
|---|---|---|---|---|
| | | Young | Mature | |
| 1,3,3-tetraflurotetra-chloropropane | 1.25 | 100 | 100 | |
| | .2 | 100 | 50 | 95 |
| 1-dichloronitroethane | 1.25 | 100 | 100 | |
| | .2 | 100 | 100 | |
| Control | | 0 | 0 | 0 |

The 1,1,3,3-tetrafluorotetrachloropropane showed substantially no signs of phytotoxicity whereas the 1,1-dichloronitroethane was severely phytotoxic to the ivy geranium leaves causing complete discoloration within a 24 hour period.

Table IV indicates standard fumigation tests of the compounds of the present invention against two-spotted spider mite on potted horticultural (cranberry) bean plants in comparison with 1,1-dichloronitroethane both against a control test in which no fumigant at all was used.

In this procedure, the bean plants are placed in 2½ inch pots and are infested with mites (all stages) one day before treatment. During exposure, the entire pot was enclosed in aluminum foil to prevent excess moisture in the air. Following exposure to the fumigants, the potted plants were placed in irrigated trays in greenhouse and observations were periodically made.

TABLE IV

| Compound | No. Females | Kill | | No. of Eggs Hatched |
|---|---|---|---|---|
| | | No. | Percent | |
| 1,3,3-tetrafluorotetrachloropropane | 20 | 20 | 100 | 0 |
| 1,3-trifluoropentachloropropane | 59 | 59 | 100 | 0 |
| 1-dichloronitroethane | 93 | 39 | 100 | 0 |
| Control | 30 | 0 | 0 | ¹ 450 |

¹ Estimated.

1,1,3,3-tetrafluorotetrachloropropane may be prepared from the fluorination of 1,3-difluorohexachloropropane, according to the method of fluorination as described in the Journal of the American Chemical Society 60 (1939), page 2491. 1,1,3,3-tetrafluorotetrachloropropane boils at 112° C. and has a molecular weight of 253.9. 1,1,3-trifluoropentachloropropane may be prepared from the fluorination of 1,3-difluorohexachloropropane as described in the above article, has a boiling point of 152.3° C. and has a molecular weight of 270.3.

While the above describes the preferred embodiments of my invention, it will be understood that departures may be made therefrom within the scope of the specification and claims.

I claim:
1. A process for combatting pest organisms by fumigation, the step which comprises contacting such organisms with the vapor of a fluorochloropropane having the general formula:

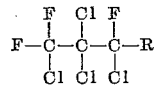

wherein R is a member selected from the group consisting of a chlorine atom and a fluorine atom.

2. A process for combatting pest organisms by fumigation, a step which comprises contacting such organisms with the vapor of a fluorochloropropane having the general formula:

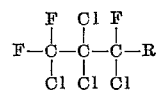

wherein R is a member selected from the group consisting of a chlorine atom and a fluorine atom in a concentration of about 0.2–2.5 pounds of fluorochloropropane compound per 1000 cubic feet of enclosed space.

3. In a process for controlling pest organisms in stored grain in enclosed spaces the step which comprises placing on top of the grain a quantity of a liquid fluorochloropropane having the formula:

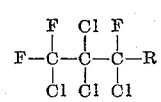

wherein R is a member selected from the group consisting of a chlorine atom and a fluorine atom under conditions which allow for vaporization of the fluorochloropropane, and maintaining the grain containing space in closed position until the liquid fluorochloropropane is substantially completely vaporized and permeates the enclosed space.

4. In a process for combatting pest organism by fumigation, the step which comprises contacting such organism with vapors of 1,1,3,3-tetrafluorotetrachloropropane.

5. In a process for combatting pest organism by fumigation, the step which comprises contacting such organism with vapors of 1,1,3-trifluoropentachloropropane.

References Cited by the Examiner

UNITED STATES PATENTS

| | | | |
|---|---|---|---|
| 2,673,173 | 3/1954 | Ruh | 167—22 |
| 2,842,603 | 7/1958 | Miller | 167—22 |
| 2,904,601 | 9/1959 | Ilgenfritz | 260—653 |

OTHER REFERENCES

Chemical Abstracts: vol. 53, p. 16952h (1959), vol. 55, p. 9956i (1961).

LEWIS GOTTS, *Primary Examiner.*

DONALD MOYER, *Assistant Examiner.*